(12) United States Patent
Freund et al.

(10) Patent No.: US 12,280,888 B2
(45) Date of Patent: Apr. 22, 2025

(54) EXHAUST NOZZLE ASSEMBLY, PROPULSION SYSTEM EMPLOYING THE EXHAUST NOZZLE ASSEMBLY, AND AIRCRAFT EMPLOYING THE PROPULSION SYSTEM

(71) Applicant: Gulfstream Aerospace Corporation, Savannah, GA (US)

(72) Inventors: Donald Freund, Savannah, GA (US); Derek Muzychka, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 18/494,181

(22) Filed: Oct. 25, 2023

(65) Prior Publication Data
US 2024/0059421 A1 Feb. 22, 2024

Related U.S. Application Data

(63) Continuation of application No. 17/301,239, filed on Mar. 30, 2021, now Pat. No. 11,834,189.
(Continued)

(51) Int. Cl.
*B64D 33/04* (2006.01)
*B64D 27/16* (2006.01)
(Continued)

(52) U.S. Cl.
CPC .............. *B64D 33/04* (2013.01); *B64D 27/16* (2013.01); *B64D 29/02* (2013.01); *B64D 29/04* (2013.01);
(Continued)

(58) Field of Classification Search
CPC ..... F02K 1/04; F02K 1/16; F02K 1/08; F02K 1/09; F02K 1/10; F02K 1/11; F02K 1/12;
(Continued)

(56) References Cited

U.S. PATENT DOCUMENTS

| 3,347,467 A | * | 10/1967 | Anton | F02K 1/123 239/265.31 |
| 3,829,020 A | * | 8/1974 | Stearns | F02K 1/09 239/265.29 |
| 4,043,508 A | * | 8/1977 | Speir | F02K 1/08 239/265.19 |
| 11,143,052 B2 | * | 10/2021 | Tersmette | F01D 9/02 |
| 11,181,074 B2 | * | 11/2021 | Atassi | F02K 1/82 |
| 11,430,482 B1 | * | 8/2022 | Rajauria | G11B 21/106 |

(Continued)

FOREIGN PATENT DOCUMENTS

| EP | 1619376 A2 | 1/2006 | |
| GB | 2054745 A | 2/1981 | |
| GB | 2588653 A * | 5/2021 | ............. F01D 17/18 |

*Primary Examiner* — Craig Kim
(74) *Attorney, Agent, or Firm* — Lorenz & Kopf, LLP

(57) ABSTRACT

An exhaust nozzle assembly includes, but is not limited to, a nozzle body configured to be fluidly coupled with an engine and to receive a jet produced by the engine. An outer cover covers the nozzle body. A movable component is disposed and configured to have an effect on either the jet or an exhaust plume when the movable component moves. A linkage is coupled to the movable component and adapted for coupling to an actuator. The linkage transmits the force to the moveable component from the actuator. There is a gap between an inner surface of the outer cover and an outer surface of the nozzle body. The linkage is smaller than the actuator. The gap is smaller than a smallest dimension of the actuator and larger than the linkage. The linkage is partially disposed within the gap, and the exhaust nozzle assembly is free of the actuator.

17 Claims, 6 Drawing Sheets

Related U.S. Application Data

(60) Provisional application No. 63/007,516, filed on Apr. 9, 2020.

(51) Int. Cl.
  *B64D 29/02* (2006.01)
  *B64D 29/04* (2006.01)
  *B64D 29/06* (2006.01)
  *F02K 1/56* (2006.01)
  *F02K 1/76* (2006.01)

(52) U.S. Cl.
  CPC ............... *B64D 29/06* (2013.01); *F02K 1/56* (2013.01); *F02K 1/763* (2013.01)

(58) Field of Classification Search
  CPC ........ B64D 29/02; B64D 29/04; B64D 29/06; B64D 27/16
  See application file for complete search history.

(56) References Cited

U.S. PATENT DOCUMENTS

| | | | |
|---|---|---|---|
| 2010/0162684 A1* | 7/2010 | Baker | F02K 3/075 60/226.3 |
| 2011/0302907 A1* | 12/2011 | Murphy | F02K 1/06 60/226.3 |
| 2012/0124962 A1 | 5/2012 | Parham | |
| 2012/0151897 A1 | 6/2012 | Kopecek et al. | |
| 2012/0192543 A1* | 8/2012 | Aeberli | F02C 7/24 60/226.1 |
| 2014/0263737 A1 | 9/2014 | Pierluissi et al. | |
| 2015/0308374 A1* | 10/2015 | Gormley | F02K 1/09 60/226.3 |
| 2016/0123178 A1* | 5/2016 | Tersmette | F02K 1/09 239/11 |
| 2016/0363097 A1 | 12/2016 | Foutch | |
| 2020/0025133 A1* | 1/2020 | Watson | F02K 1/06 |
| 2021/0190004 A1* | 6/2021 | Todorovic | F02K 1/72 |
| 2021/0270206 A1* | 9/2021 | Sanderson | F02K 1/08 |
| 2021/0301761 A1* | 9/2021 | Taylor | F02K 1/386 |

* cited by examiner

EXHAUST NOZZLE ASSEMBLY, PROPULSION SYSTEM EMPLOYING THE EXHAUST NOZZLE ASSEMBLY, AND AIRCRAFT EMPLOYING THE PROPULSION SYSTEM

CROSS-REFERENCE TO RELATED APPLICATION

This application is a continuation of U.S. application Ser. No. 17/301,239, filed Mar. 30, 2021, which claims the benefit of U.S. Provisional Application No. 63/007,516, filed Apr. 9, 2020. These applications are incorporated herein by reference in their entirety.

TECHNICAL FIELD

The present invention relates generally to an aircraft, and more particularly relates to an exhaust nozzle assembly, a propulsion system for the aircraft, the propulsion system employing the exhaust nozzle assembly, and an aircraft employing the propulsion system.

BACKGROUND

Aircraft performance (e.g., maximum speed; rates of fuel consumption at cruise speed) is hampered by drag, among other factors. It is therefore desirable to reduce the drag acting on an aircraft to the extent possible. An aircraft's propulsion system can contribute significantly to the drag acting on the aircraft. The larger the radial periphery of the propulsion system is (e.g., its diameter), the larger the amount of drag acting on the propulsion system will be. Accordingly, it is desirable that the radial periphery of an aircraft's propulsion system be as small as possible. This principle applies with equal force to each of the discrete elements of the propulsion system that come into direct contact with the free stream, including, but not limited to the propulsion system's nozzle assembly.

Some of the mechanisms that are necessary to facilitate operation of the various functions of a nozzle assembly have conventionally been mounted within the nozzle assembly's structure and housed beneath the nozzle assembly's cowl. The nozzle assembly's cowl forms the outer mold line (OML) of the nozzle assembly and the mechanisms discussed above (e.g., actuators) reside in the gap that is formed between the outer surface of the nozzle body and the inner surface of the cowl. For example, nozzle assemblies typically include actuators that are used to control the movement of various movable components associated with the nozzle assembly, such as, but not limited to, a variable nozzle throat (known in the art as station A8), a variable exit plane (known in the art as station A9), and a thrust reverser. Conventionally, these actuators are mounted to the structure of the nozzle assembly but are not visible during normal operation of the propulsion system because these mechanisms are covered by the cowl of the nozzle assembly. For this reason, the cowl has conventionally been shaped/dimensioned to accommodate these mechanisms. This causes the cowl to have a larger periphery than it otherwise would have if there were no need to accommodate these mechanisms. As stated above, a larger periphery has a negative impact on the drag imparted by the nozzle assembly and, by extension, by the entire propulsion system. However, because these mechanisms are necessary to perform the various functions of the nozzle assembly, they cannot simply be omitted.

Accordingly, it is desirable to continue providing the functionality of these actuators without having to enlarge the periphery of the nozzle assembly to accommodate their presence. It is further desirable to provide a method of manufacturing a propulsion system that employs a nozzle assembly having a reduced periphery. Furthermore, other desirable features and characteristics will become apparent from the subsequent summary and detailed description and the appended claims, taken in conjunction with the accompanying drawings and the foregoing technical field and background.

BRIEF SUMMARY

An exhaust nozzle assembly for use with a propulsion system of an aircraft, a propulsion system employing the exhaust nozzle assembly, and a method of assembling the propulsion system are disclosed herein.

In a first non-limiting embodiment, the exhaust nozzle assembly, which is intended for use with a propulsion system having an engine that is configured to produce a jet, includes, but is not limited to, a nozzle body configured to be fluidly coupled with the engine and to receive the jet. The exhaust nozzle assembly further includes, but is not limited to, an outer cover at least partially covering the nozzle body. The exhaust nozzle assembly further includes, but is not limited to, a movable component that is configured to move between a first position and a second position when a force is applied to the movable component. The movable component is disposed and configured to have an effect on one of the jet and an exhaust plume produced by the propulsion system when the movable component moves between the first position and the second position. The exhaust nozzle assembly still further includes, but is not limited to, a linkage that is coupled to the movable component and that is adapted for coupling to an actuator configured to generate the force. The linkage transmits the force to the moveable component when the linkage is coupled with the actuator and when the actuator is actuated. A gap exists between an inner surface of the outer cover and an outer surface of the nozzle body. The linkage is partially disposed within the gap. The exhaust nozzle assembly is free of the actuator.

In another non-limiting embodiment, the propulsion system for an aircraft includes, but is not limited to, an engine that is configured to produce a jet. The propulsion system further includes, but is not limited to, an exhaust nozzle assembly that is disposed downstream of the engine. The nozzle assembly includes, but is not limited to a nozzle body fluidly coupled with the engine and configured to receive the jet, an outer cover at least partially covering the nozzle body, a movable component that is configured to move between a first position and a second position when a force is applied to the movable component, the movable component disposed and configured to have an effect on one of the jet and an exhaust plume produced by the propulsion system when the movable component moves between the first position and the second position, and a linkage coupled to the movable component and adapted for coupling to an actuator, the actuator configured to generate the force, the linkage transmitting the force to the moveable component when the linkage is coupled with the actuator and when the actuator is actuated. A gap exists between an inner surface of the outer cover and an outer surface of the nozzle body. The linkage is partially disposed within the gap. The exhaust nozzle assembly is free of the actuator.

In another non-limiting embodiment, the aircraft includes, but is not limited to, a fuselage. The aircraft further includes, but is not limited to, a wing coupled with the fuselage. The aircraft further includes, but is not limited to, an actuator associated with one of the fuselage and the wing. The aircraft still further includes, but is not limited to, a propulsion system mounted to one of the fuselage and the wing. The propulsion system includes, but is not limited to, an engine configured to produce a jet, and an exhaust nozzle assembly disposed downstream of the engine. The exhaust nozzle assembly includes, but is not limited to, a nozzle body fluidly coupled with the engine and configured to receive the jet, an outer cover at least partially covering the nozzle body, a movable component configured to move between a first position and a second position when a force is applied to the movable component, the movable component disposed and configured to have an effect on one of the jet and an exhaust plume produced by the propulsion system when the movable component moves between the first position and the second position, and a linkage coupled to the movable component and further coupled to the actuator, the actuator configured to generate the force, the linkage transmitting the force to the moveable component when the actuator is actuated. A gap exists between an inner surface of the outer cover and an outer surface of the nozzle body. The linkage is partially disposed within the gap. The exhaust nozzle assembly is free of the actuator.

In yet another non-limiting embodiment, the aircraft includes, but is not limited to, a fuselage. The aircraft further includes, but is not limited to, a wing coupled with the fuselage. The aircraft further includes, but is not limited to, an actuator associated with one of the fuselage and the wing. The aircraft still further includes, but is not limited to, a propulsion system mounted to one of the fuselage and the wing. The propulsion system includes, but is not limited to, an engine configured to produce a jet, and an exhaust nozzle assembly disposed downstream of the engine. The exhaust nozzle assembly includes, but is not limited to, a nozzle body fluidly coupled with the engine and configured to receive the jet, an outer cover at least partially covering the nozzle body, a movable component configured to move between a first position and a second position when a force is applied to the movable component, the movable component disposed and configured to have an effect on one of the jet and an exhaust plume produced by the propulsion system when the movable component moves between the first position and the second position, and a linkage coupled to the movable component and further coupled to the actuator, the actuator configured to generate the force, the linkage transmitting the force to the moveable component when the actuator is actuated. A gap exists between an inner surface of the outer cover and an outer surface of the nozzle body. The linkage is partially disposed within the gap. The actuator is mounted to an external surface of the nozzle body proximate a mounting location. The mounting location comprises a location on the external surface of the nozzle body where the propulsion system is mounted to the one of the fuselage and the wing. The propulsion system is mounted to the one of the fuselage and the wing by a mounting structure. The actuator is enclosed within a fairing associated with the mounting structure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved aircraft, an improved propulsion system for use with the aircraft, an improved nozzle assembly for use with the propulsion system and a method of assembling the propulsion system are disclosed herein. In an effort to reduce the dimensions of the radial periphery of the nozzle assembly, the invention disclosed herein entails the relocation of the actuator mechanism(s) (also referred to herein as "actuators") for the movable component(s) of the nozzle assembly from the nozzle assembly itself to some other location on the aircraft and further, to provide a linkage that extends from the actuator mechanism(s) to the moveable component(s). Because the actuators for the movable components of the nozzle assembly are conventionally housed in the gap between the nozzle body and the cowl covering the nozzle body, removing the actuators from the gap provides an opportunity to narrow the gap between the nozzle body and the cowl. This, in turn, leads to a diminished nozzle assembly radial periphery along a longitudinal axis of the nozzle assembly. With the actuator disposed at a location spaced apart from the nozzle assembly (e.g., the actuator and a portion of the linkage may be housed in a pylon that is used to mount the propulsion system to the aircraft or the actuator may be mounted to the fuselage with the associated linkage being routed to the movable component through the pylon), the gap need only be large enough to accommodate the linkage. By diminishing the magnitude of the gap, the cowl is effectively "shrink-wrapped" around the nozzle body as much as possible, reducing the nozzle assembly's cross-sectional profile, reducing drag, improving fuel consumption, diminishing the magnitude of any resulting sonic boom, and improving overall performance of the propulsion system and of the aircraft that the propulsion system is mounted to.

A greater understanding of the aircraft, the propulsion system, and the nozzle assembly discussed above as well as a method of manufacturing the propulsion system may be obtained through a review of the illustrations accompanying this application together with a review of the detailed description that follows.

Figure 1:
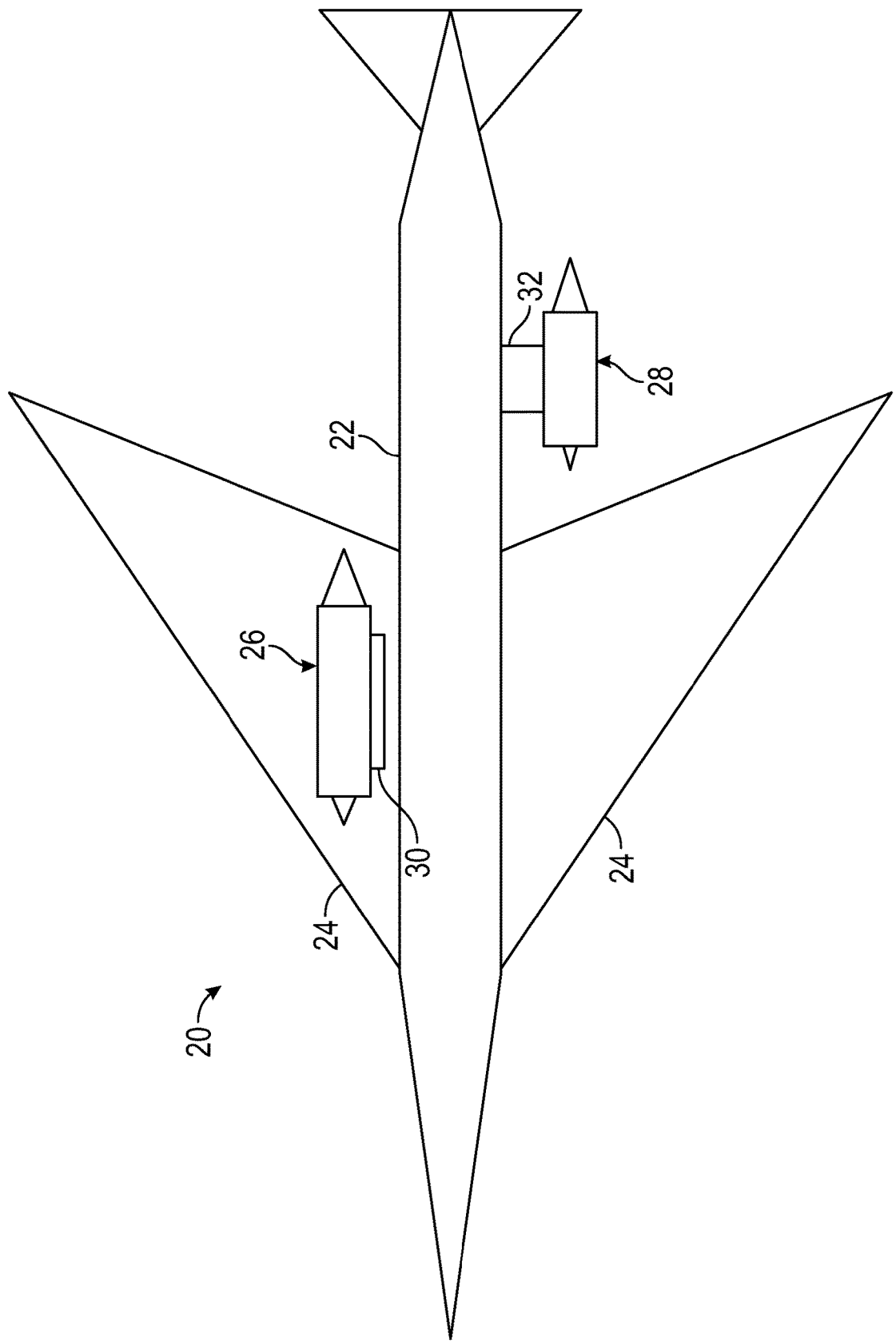
FIG. 1 is a schematic, overhead view of a non-limiting embodiment of an aircraft made in accordance with the teachings disclosed herein.

FIG. 1 is a schematic, plan view of an aircraft 20 made in accordance with the teachings of the present disclosure. In the illustrated embodiment, aircraft 20 is a notional supersonic aircraft capable of traveling at speeds in excess of Mach 1. However, it should be understood that the teachings disclosed herein are not limited to supersonic aircraft, but rather, are suitable for use with sub-sonic aircraft as well. Furthermore, while the teachings herein are disclosed and discussed in the context of a fixed-wing aircraft, they are compatible with rotary aircraft as well. Further, the teachings disclosed herein are not limited to use with aircraft but are also compatible with other types of vehicles such as spacecraft, watercraft, and land-based vehicles. Further, any type of vehicle and any other machine or mechanism that utilizes a propulsion system may or machinery of any sort that would benefit from having a tighter arrangement between the propulsion system or machine, on the one hand, and the outer shell, cowl, or packaging of any sort, may employ the teachings disclosed herein.

Aircraft 20 has a fuselage 22 and a pair of wings 24. Aircraft 20 has been equipped with two propulsion systems, a propulsion system 26 and a propulsion system 28. As illustrated, propulsion system 26 has been mounted to one of the wings 24 while propulsion system 28 has been mounted to an aft portion of fuselage 22. This has been done for the purpose of simplifying this disclosure by illustrating multiple common mounting schemes without providing multiple respective illustrations. It should be understood that in an actual implementation of an aircraft having multiple propulsion systems that employ the invention disclosed herein, all of the propulsion systems would most likely be mounted to either exclusively the wings of the aircraft or to exclusively the fuselage of the aircraft. However, the teachings herein are to be construed to any configuration for mounting propulsion systems to aircraft whether or not they adhere to this common approach.

FIG. 1 illustrates that propulsion system 26 has been mounted to an upper surface of wing 24 via a pylon 30. It should be understood that in other embodiments, propulsion system 26 may be mounted to an underside of wing 24 without departing from the teachings of the present disclosure. In still other embodiments, propulsion system 26 may be partially or entirely embedded within wing 24 without departing from the teachings of the present disclosure.

Propulsion system 28 has been mounted to a lateral side of fuselage 22 at a location aft of pair of wings 24, via pylon 32. In other embodiments, propulsion system 28 may be mounted to any other circumferential location around the circumference of fuselage 22. Further, propulsion system 28 may alternatively be mounted at any other longitudinal position along a longitudinal length of fuselage 22, without departing from the teachings of the present disclosure.

Figure 2:
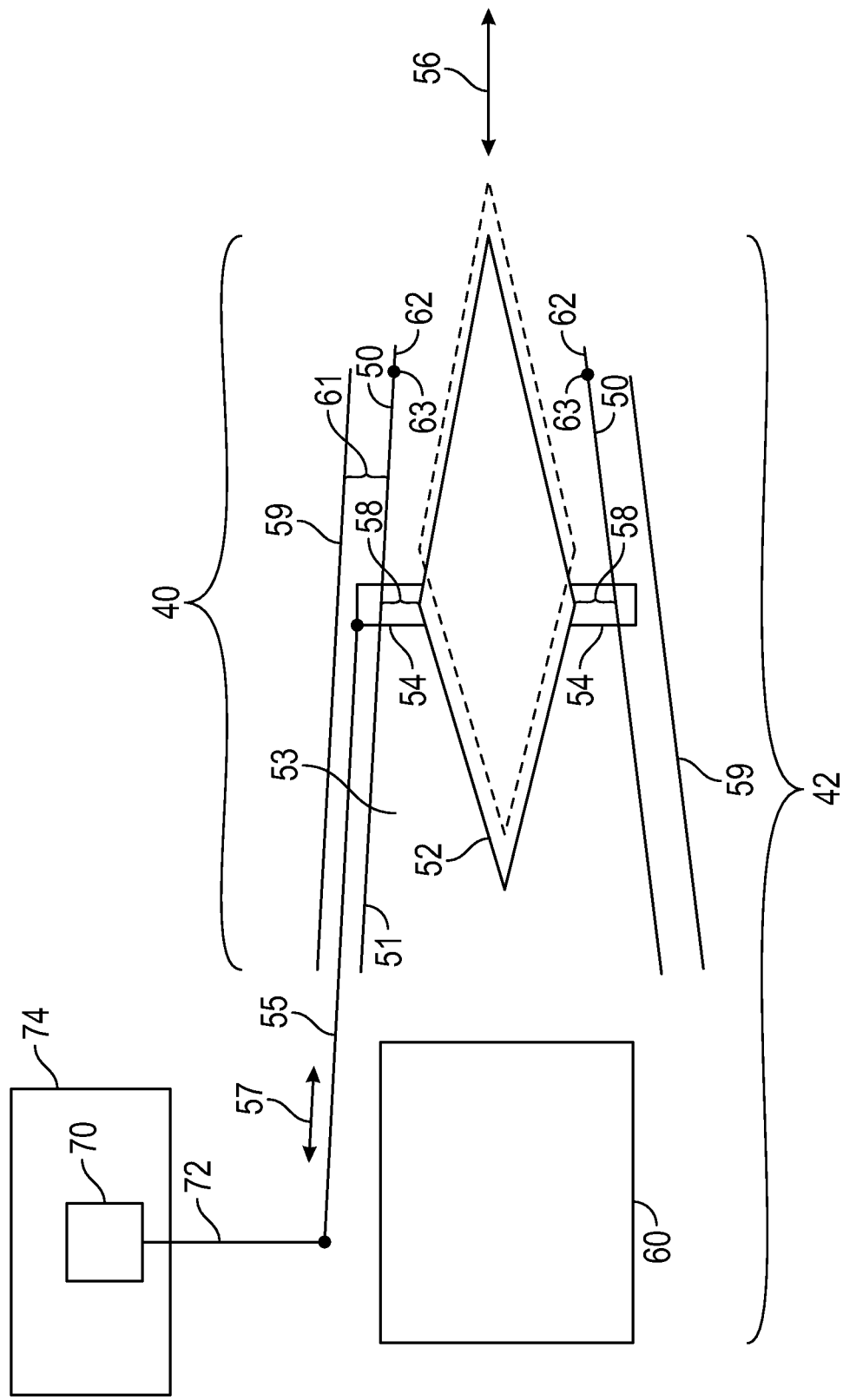
FIG. 2 is a schematic cross-sectional view illustrating a non-limiting embodiment of a nozzle assembly and a propulsion system made in accordance with the teachings disclosed herein.

With continuing reference to FIG. 1, FIG. 2 is a schematic cross-sectional view of a propulsion system 42 equipped with a nozzle assembly 40. In some non-limiting embodiments, propulsion system 26 and/or propulsion system 28 may comprise propulsion system 42. Accordingly, propulsion system 42 may be mounted to an upper surface of an aircraft's wing, to the lateral sides of an aft portion of the fuselage, or at any other suitable location on the aircraft without departing from the teachings of the present disclosure. For avoidance of confusion, aircraft component 74, discussed in detail below, is not part of propulsion system 42.

In the non-limiting embodiment illustrated in FIG. 2, nozzle assembly 40 and propulsion system 42 are axisymmetric assemblies. In other embodiments, rather than having an axisymmetric configuration, nozzle assembly 40 and propulsion system 42 may have a non-axisymmetric configuration. Furthermore, it should be understood that the teachings of the present disclosure are not limited in any way to use with propulsion systems having the configuration shown in FIG. 2. Rather, the configuration shown in FIG. 2 are exemplary only and have been chosen for ease of illustration.

As illustrated in FIG. 2, nozzle assembly 40 includes a nozzle body 50. In the illustrated embodiment, nozzle body 50 has a truncated conical configuration that tapers in an aft direction. In other embodiments, nozzle body 50 may have a truncated conical configuration that expands in the aft direction. In other embodiments, nozzle body 50 may have a cylindrical configuration that neither tapers nor expands in the aft direction but rather that has a constant cross-sectional dimension and/or configuration. In still other embodiments, nozzle body 50 may have any other suitable configuration without departing from the teachings of the present disclosure. Nozzle body 50 has an interior wall 51 that defines a pathway 53. Pathway 53 receives and guides a jet exhausted by an engine and directed by the engine into nozzle body 50.

In the illustrated embodiment, nozzle assembly 40 further includes a center body 52. In the illustrated embodiment, center body 52 has a diamond configuration. In other embodiments, nozzle assembly 40 may have any other suitable configuration without departing from the teachings of the present disclosure. In still other embodiments, nozzle assembly 40 may omit center body 52 altogether without departing from the teachings of the present disclosure. An aft portion of center body 52 comprises a nozzle plug that is configured to control the expansion of the jet as it exits nozzle assembly 40. For avoidance of confusion, as used herein, the term "jet" refers to the high energy mass flow created by a propulsion system's engine starting from the point at which it passes through the exit plane of the engine's exhaust and continuing until it reaches the exit plane of the nozzle. The term "plume" or "exhaust plume" refers to the high energy mass flow after it has passed the nozzle's exit plane and interacts with the freestream. In the illustrated embodiment, center body 52 is mounted to nozzle body 50 via struts 54. In other embodiments, any other suitable mounting mechanism effective to support center body 50 within pathway 51 may be employed. In the illustrated embodiment, the upper and lower portions of struts 54 protrude through interior wall 51. In other embodiments, the upper and lower portions of struts 54 may be mounted within channels defined in interior wall 51. In still other embodiments, upper and lower portions of struts 54 may be engaged with wall 51 or with any other portion of nozzle assembly 40 that permits a sliding or translating arrangement to permit movement of center body 52, as discussed in detail below.

A nozzle throat 58 is formed at a location where the distance between inner wall 51 and center body 52 is the smallest. In other words, nozzle throat 58 is the portion of pathway 53 where the cross-sectional area of pathway 53 is the smallest. Engine designers often design the location and dimension of a nozzle's throat to cause the jet flowing through the throat to choke (i.e., to reach the local speed of sound). The location and dimensions of the nozzle's throat are based on anticipated flow pressures, among other factors. A nozzle's throat is known in the art as station A8.

In the illustrated embodiment, center body 52 is configured to translate in a longitudinal direction as indicated by the double headed arrow 56. In an embodiment, struts 54 may be configured to slide within a slot defined in inner walls 51 to cause center body 52 to move between a forward position (illustrated in solid lines) and an aft position (illustrated in phantom lines). In the illustrated embodiment, the longitudinal translation of center body 52 will have an effect on the dimension of nozzle throat 58. In the illustrated embodiment, nozzle throat 58 will expand as center body 52 moves towards the forward position and nozzle throat 58 will contract as center body 52 moves towards the aft position. Altering the size of nozzle throat 58 provides a means to control the pressure and thrust of the jet and the exhaust plume passing through pathway 53 and exiting nozzle assembly 40, respectively.

It should be understood that the embodiment of a variable nozzle throat disclosed above is exemplary in nature and that there is no intent to limit application of the invention disclosed herein to variable nozzle throats having the illustrated configuration. Rather, the invention disclosed herein is compatible for use with any suitable mechanism effective to vary the dimensions of the nozzle throat. Furthermore, there is no intent to limit application of the invention disclosed herein to nozzle assemblies having variable nozzle throats. Rather, the invention disclosed herein is compatible for use with nozzle assemblies having other moving parts that require actuation regardless of whether the nozzle throat can be varied.

Nozzle assembly 40 further includes a cowl 59. Cowl 59 is an outer skin that covers and encloses nozzle body 50. Cowl 59 interacts with the free stream of air passing over nozzle assembly 40 and has a smooth, aerodynamic shape that is designed to reduce and/or minimize induced drag acting on nozzle assembly 40. As illustrated, there is a gap 61 disposed between an inner surface of cowl 59 and an outer surface of nozzle body 50.

Nozzle assembly 40 further includes an expandable exit plane comprising a pivotable flap 62 configured to pivot about hinge 63. As illustrated in FIG. 2, pivotable flap 62 is aligned with the wall forming nozzle body 50 to form an exit plane having a first dimension. When pivotable flap 62 pivots about hinge 63 in an outward direction (i.e., away from center body 52), the exit plane of nozzle assembly 40 expands. Conversely, when pivotable flap 62 rotates in an inward direction (i.e., towards center body 52), the exit plane contracts. It may be necessary to expand or contract the exit plane to accommodate an under-expanded exhaust plume or an over expanded exhaust plume, respectively.

It should be understood that the embodiment of an expandable exit plane disclosed herein is exemplary in nature and that there is no intent to limit application of the invention disclosed herein to variable exit planes having the illustrated configuration. Rather, the invention disclosed herein is compatible for use with any suitable mechanism effective to vary the dimensions of the exit plane. Further, it should be understood that there is no intent to limit application of the invention disclosed herein to nozzle assemblies having variable exit planes. Rather, the invention disclosed herein is compatible for use with nozzle assemblies having a static exit plane.

Nozzle assembly 40 further includes a linkage 55. In a non-limiting embodiment, linkage 55 may comprise a cylindrical rod fabricated from a metal material and configured to transmit a force. In other embodiments, linkage 55 may be fabricated from any other suitable material and may have any other suitable configuration that is effective to transmit a force. In FIG. 2, linkage 55 is disposed within gap 61 and is configured to move longitudinally back and forth in the direction indicated by double headed arrow 57. Linkage 55 is coupled, at its aft end, with strut 54. As linkage 55 moves longitudinally back and forth through gap 61, a force is transmitted through linkage 55 to strut 54. This, in turn, causes center body 52 to also move longitudinally back and forth in a corresponding manner.

Propulsion system 42 comprises nozzle assembly 40 and engine 60. In the illustrated embodiment, engine 60 comprises a gas turbine engine configured to produce a jet (i.e., a high pressure, high energy mass flow). In other embodiments, engine 60 may comprise any engine configured to produce a jet capable of propelling or contributing to the propulsion of a vehicle such as, but not limited to, aircraft 20. In some embodiments, engine 60 may have an engine bypass or some other feature (or an additional feature) resulting in the engine producing multiple streams. For the sake of brevity, when the defined term "jet" is used herein, it should be construed to include the combination of all streams discharged and/or otherwise exhausted by engine 60 and directed into nozzle assembly 40. Nozzle body 50 is fluidly coupled with an aft portion of engine 60. Coupled in this manner, nozzle body 50 is arranged and positioned to receive the jet exhausted by engine 60. Once nozzle body 50 receives the jet, the jet proceeds downstream through nozzle body 50 along pathway 53.

Propulsion system 42 may include additional components. For example, propulsion system 42 may include a compression surface to slow an approaching supersonic free stream of air. Propulsion system 42 may also include an inlet to guide the free stream of air to a front face of engine 60. Propulsion system 42 may also include a nacelle to provide an aerodynamic outer shell for engine 60 and a portion of nozzle assembly 40 to reduce drag and to minimize the generation of shocks that would otherwise be generated as the free stream of air passes over propulsion system 42. Propulsion system 42 may also include an afterburner disposed within nozzle assembly 40 to reheat the jet, adding energy to it and enhancing the thrust that the jet is capable of imparting. Propulsion system 42 may include various other components and features as well without departing from the teachings of the present disclosure. These various components and features have been omitted from the figures for the sake of simplification.

As illustrated in FIG. 2, a forward end of linkage 55 is coupled with an actuator 70 via actuator arm 72. In the illustrated embodiment, actuator 70 is configured to move actuator arm 72 in a manner that applies a force in the longitudinal direction to linkage 55 that, in turn, causes the longitudinal movement of linkage 55 indicated by double headed arrow 57. Actuator 70 may comprise a linear actuator, a rotary actuator, a mechanical lock that is actuated through deactivation, or any other type of actuator effective to apply a force to linkage 55 that causes the longitudinal movement indicated by double headed arrow 57.

Actuator 70 is mounted to aircraft component 74. Aircraft component 74 may comprise any part, portion, or component of aircraft 20 that is spaced apart from nozzle assembly 40. For example, and without limitation, aircraft component 74 may comprise a part of wing 24 or a part of fuselage 22. In other embodiments, aircraft component 74 may comprise pylon 30 or pylon 32. In still other embodiments, aircraft component 74 may comprise any part, portion, or component of aircraft 20 other than propulsion system 42.

As discussed in the Background section above, in a conventional nozzle assembly, actuator 70 would be mounted to the outer surface of nozzle body 50. This required that gap 61 be given a dimension that is large enough to accommodate actuator 70. In embodiments where all dimensions of actuator 70 (e.g., the length and the width and the height) exceed the thickness of linkage 55, then by disposing actuator 70 at a location that is spaced apart from nozzle assembly 40, the dimension of gap 61 may be decreased as compared with the dimension of the gap on a conventional nozzle assembly. In the illustrated embodiment, gap 61 has depicted as being many times larger than a thickness of linkage 55 for ease of illustration. However, it should be understood that gap 61 need only be wide enough to accommodate the smallest dimension of linkage 55 in order to permit linkage 55 to move (e.g, to longitudinally translate back and forth or to rotate or to pivot or any combination thereof). Accordingly, a substantial reduction in the outer radial periphery of nozzle assembly 40 may be obtained as compared with the outer radial periphery of a convention nozzle assembly that houses an actuator in the gap between a cowl and a nozzle body. This is what is meant herein when the term "shrink wrapped" is used. Alternatively, this technology also permits for the inner radial periphery of nozzle assembly 40 (i.e., the outer radial periphery of pathway 53) to be increased without increasing the outer radial periphery of nozzle assembly 40 as compared with the outer radial periphery of a conventional nozzle assembly that houses an actuator in the gap between the cowl and the nozzle body.

Figure 3:
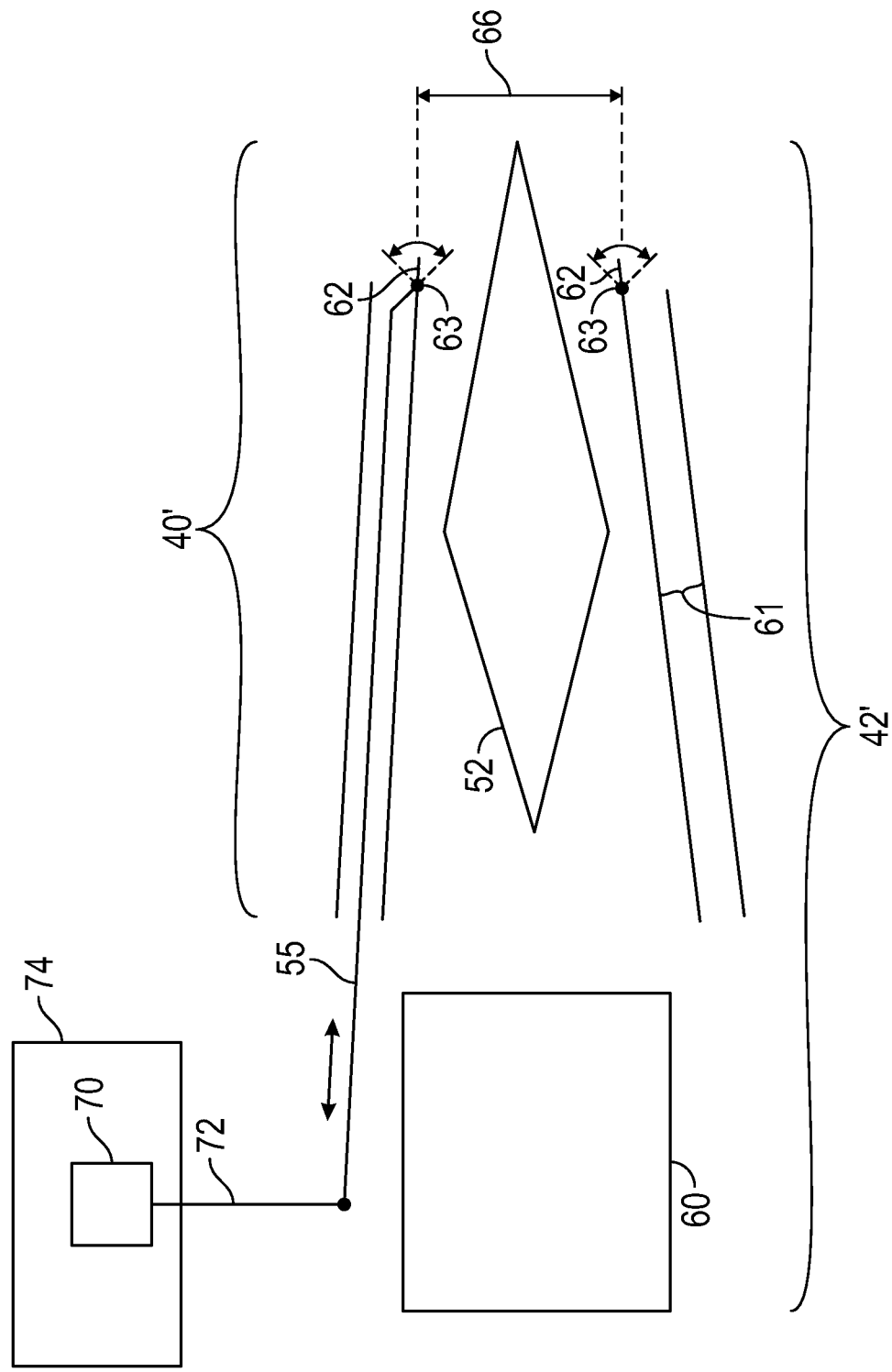
FIG. 3 is a schematic cross-sectional view illustrating an alternate non-limiting embodiment of a nozzle assembly and a propulsion system made in accordance with the teachings disclosed herein.

With continuing reference to FIGS. 1-2, FIG. 3 illustrates a nozzle assembly 40' and a propulsion system 42' which are alternate embodiments of nozzle assembly 40 and propulsion system 42, respectively. In nozzle assembly 40' and propulsion system 42', linkage 55 is not configured to move center body 52, but rather linkage 55 is coupled with hinge 63 and is configured to control the movement of pivotable flap 62, thereby controlling the expansion and contraction of an expandable exit plane 66. In the illustrated embodiment, expandable exit plane 66 is the location where the jet generated by engine 60 exits nozzle body 50, begins interacting with the ambient environment, and becomes an exhaust plume (as explained and defined above). Expandable exit plane 66 is referred to by those of ordinary skill in the art as station A9.

As actuator 70 moves linkage 55 longitudinally in an aft direction, linkage 55 causes pivotable flap 62 to pivot in an inward direction, thereby reducing the cross-sectional area of the expandable exit plane. As set forth above, this disclosure contemplates not only translation, but imparting other types of motion to linkage 55 including, but not limited to rotational motion, pivotal motion, any other type of motion, and/or combinations thereof. As actuator 70 moves linkage 55 in a longitudinally forward direction, pivotable flap 62 rotates in an outward direction, thereby expanding the cross-sectional area of the expandable exit plane. As was the case with nozzle assembly 40, in nozzle assembly 40', actuator 70 is spaced apart from nozzle assembly 40'. This allows for a reduction in the size of gap 61 which, in turn, provides the advantages discussed above, including, but not limited to, permitting nozzle assembly 40' to have a smaller radial periphery than would a conventional nozzle assembly housing the actuator within gap 61.

With continuing reference to FIGS. 1-3, FIG. 4 illustrates a nozzle assembly 40" and a propulsion system 42" which are further alternate embodiments of nozzle assembly 40 and propulsion system 42, respectively. In nozzle assembly 40" and propulsion system 42", linkage 55 is coupled with translating hinge 80 and is configured to control the deployment of a thrust reverser door 82. Thrust reverser door 82 is incorporated into cowl 59 and is disposed substantially co-planar therewith when thrust reverser door 82 is in a stowed position. Linkage 55 is configured to move longitudinally back and forth in the direction indicated by double headed arrow 84. As actuator 70 moves linkage 55 in a longitudinally aft direction, linkage 55 applies a force to translating hinge 80, causing it to also move in an aft direction. This causes thrust reverser door 82 to move in an aft direction as well.

When translating hinge 80 reaches the end of its travel, it ceases to move longitudinally aftward. As linkage 55 continues to apply force in a longitudinally aft direction to translating hinge 80 after translating hinge 80 has reached the limit of its longitudinal travel, thrust reverser door 82 will rotate about translating hinge 80. As it rotates, thrust reverser door 80 will pivot from a position substantially co-planar with the walls of nozzle body 50 to a deployed position (illustrated in phantom lines) that is substantially askew with respect to the walls of nozzle body 50. In the deployed position, an aft portion of thrust reverser door 82 is disposed to intercept the exhaust plume as it passes the exit plane of nozzle assembly 40". When disposed in this position, thrust reverser door 82 intercepts and re-direct a portion of the exhaust plume exiting nozzle assembly 40". This causes the re-directed portion of the flow to exert thrust in a generally forward direction which is opposite to the direction of travel of aircraft 20. This forward directed thrust effectively acts as a brake, slowing down aircraft 20. As with nozzle assembly 40 and nozzle assembly 40', in nozzle assembly 40", actuator 70 is spaced apart from nozzle assembly 40". This allows for a reduction in the size of gap 61 which, in turn, provides the advantages discussed above, including, but not limited to permitting nozzle assembly 40" to have a smaller radial periphery than a conventional nozzle assembly that houses the actuator within gap 61.

Figure 4:
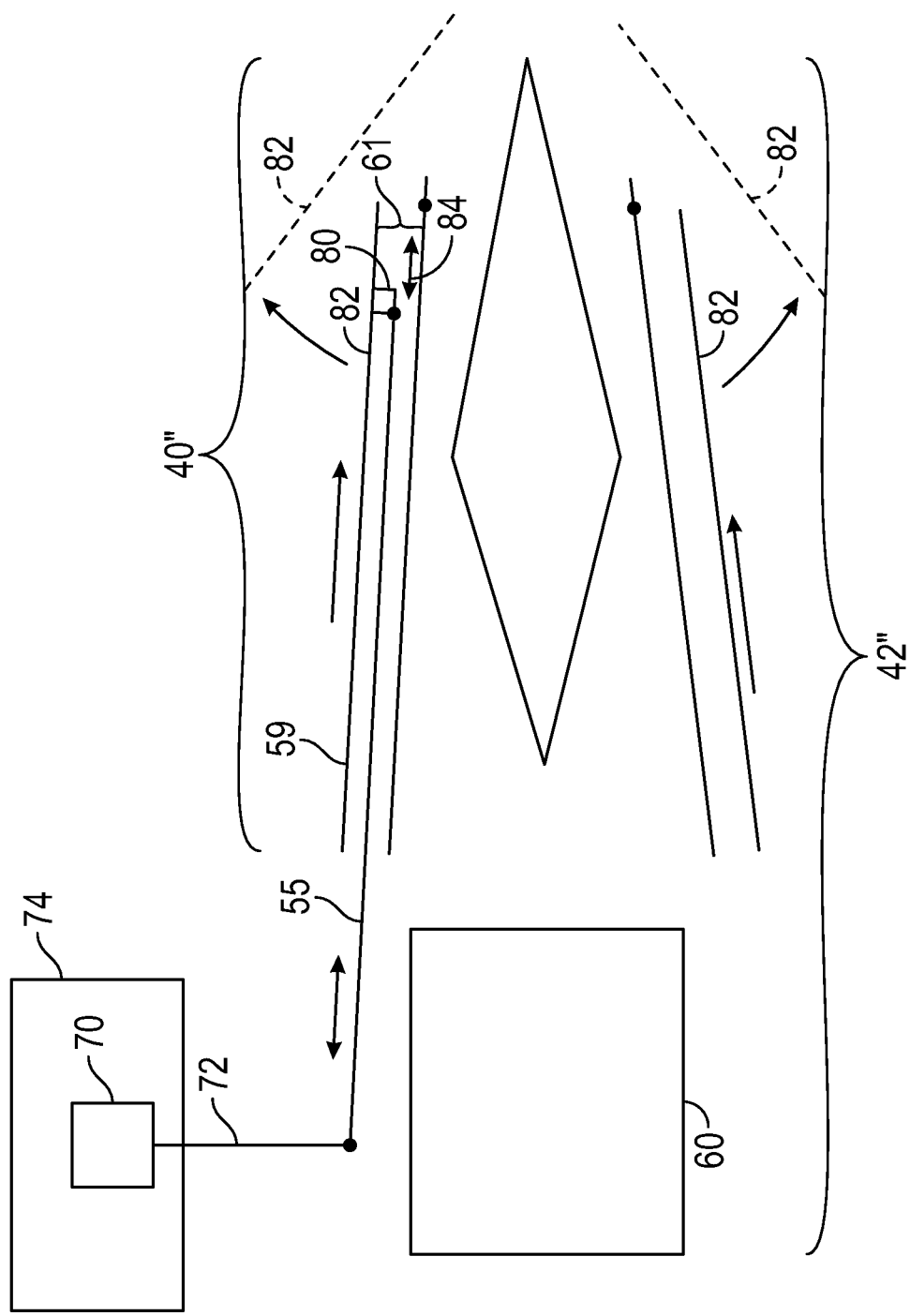
FIG. 4 is a schematic cross-sectional view illustrating another alternate embodiment of a non-limiting embodiment of a nozzle assembly and a propulsion system made in accordance with the teachings disclosed herein.

With respect to FIGS. 2-4, the above exemplary discussion addresses a nozzle assembly having a single movable component and a single actuator connected thereto via a single linkage. It should be understood that the present disclosure also envisions a nozzle assembly having a plurality of movable components and corresponding plurality of actuators mounted to locations on the aircraft other than the nozzle assembly and further having a plurality of linkages coupling such plurality of movable components to the respective plurality of actuators. For example, and without limitation, a nozzle assembly may have a thrust reverser and a variable exit plane (variable A9) or a thrust reverser and a translating center body (variable A8) or a thrust reverser and a translating center body and a variable exit plane. The teachings disclosed herein are applicable to nozzle assemblies that do, and that do not, have a center-body. In still other embodiments, additional and/or alternate movable components may be employed without departing from the teachings of the present disclosure. In still other embodiments, two or more movable components may be actuated by a single actuator and/or a single linkage without departing from the teachings of the present disclosure.

With continuing reference to FIGS. 1-4, FIG. 5 is a perspective, fragmented view illustrating a non-limiting arrangement 100 comprising various components that are compatible for use with nozzle assemblies 40, 40', and 40" as well as with other nozzle assemblies made in accordance with the teachings disclosed herein. It should be understood that arrangement 100 is merely exemplary in nature and that other arrangements having different components and/or different configurations may also be employed with nozzle assemblies having movable components such as, but not limited to nozzle assemblies 40, 40', and 40" without departing from the teachings of the present disclosure.

Arrangement 100 includes an actuator 102. Actuator 102 may comprise a linear actuator, a rotary actuator, or any other type of actuator suitable for exerting either a force or a moment or both on a linkage. For simplicity of illustration, actuator 102 has been illustrated as a rectangular box having a length of L, a height of H, and a width of W. In other embodiments, actuator 102 may have any other suitable configuration (e.g., a servo motor). In the illustrated embodiment, the smallest dimension of actuator 102 is its width W. Accordingly, the width W of actuator 102 is smaller than either its height H or its length L. In other embodiments, the length or the height may constitute the smallest dimension. As used herein, the term "smallest dimension" refers to whichever dimension of the actuator, such as actuator 102, has the smallest magnitude.

Actuator 102 is coupled with linkage 104. In the illustrated embodiment, linkage 104 comprises an elongated solid steel rod having a circular cross-section. It should be understood that linkage 104 may alternately be comprised of titanium, a nickel-based super alloy, or any other material suitable for bearing loads. It should further be understood that linkage 104 is not limited to having a circular cross-section and in other embodiments, linkage 104 may have a cylindrical configuration (i.e., it may have a hollow core), a square configuration, rectangular configuration or triangular configuration or any other configuration suitable for transmitting a force along a longitudinal axis of linkage 104 or for transmitting a rotational force (e.g., a moment or torque). In the illustrated embodiment, actuator 102 is configured to deliver a force to linkage 104 that produces a back and forth movement of linkage 104 in a longitudinal direction indicated by double headed arrow 106.

A portion of a cowl 110 and a portion of nozzle body 112 are illustrated downstream from actuator 102. A gap 114 is disposed between cowl 110 and nozzle body 112. No other components of a nozzle assembly or of a propulsion system or of an aircraft have been illustrated in FIG. 5, and it should be understood that arrangement 100 is a simplified presentation of an actuator and also of some of the other components of a nozzle assembly of a propulsion system of an aircraft as discussed and described above. It should be further understood that actuator 102 is mounted to a portion of the aircraft other than the nozzle assembly of the propulsion system. It should be further understood that, in some embodiments, actuator 102 is mounted to a portion of the aircraft other than the propulsion system.

Figure 5:
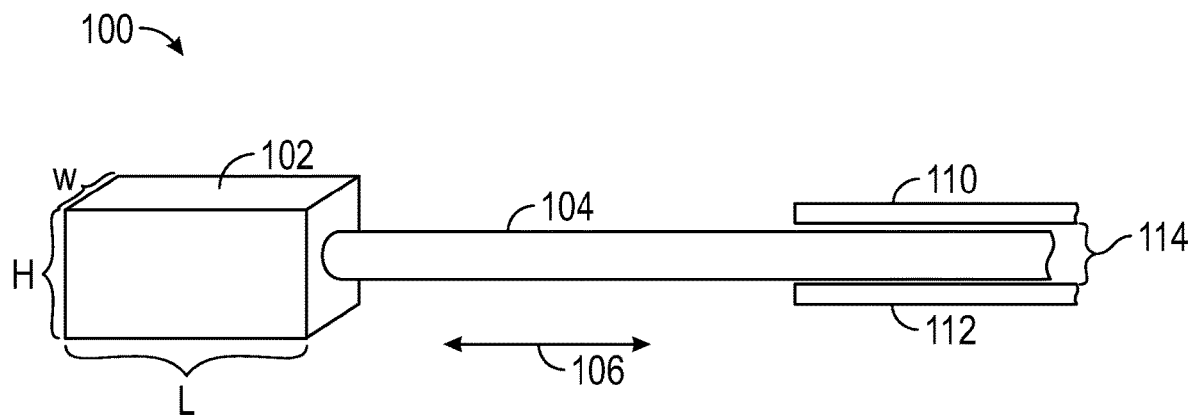
FIG. 5 is a perspective, fragmented view illustrating an arrangement of an actuator engaged with portions of a nozzle assembly made in accordance with the teachings disclosed herein.
Figure 6:
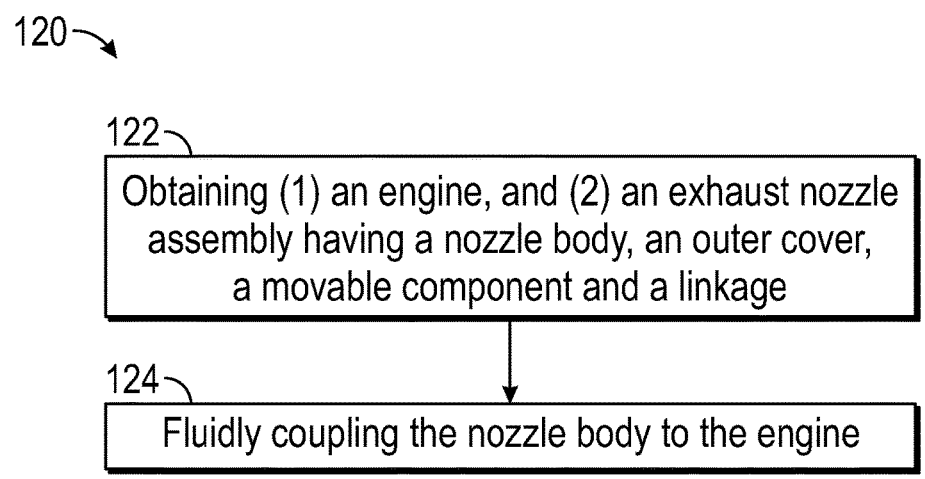
FIG. 6 is a block diagram illustrating a non-limiting embodiment of a method of making a propulsion system in accordance with the teachings disclosed herein.
Figure 7:
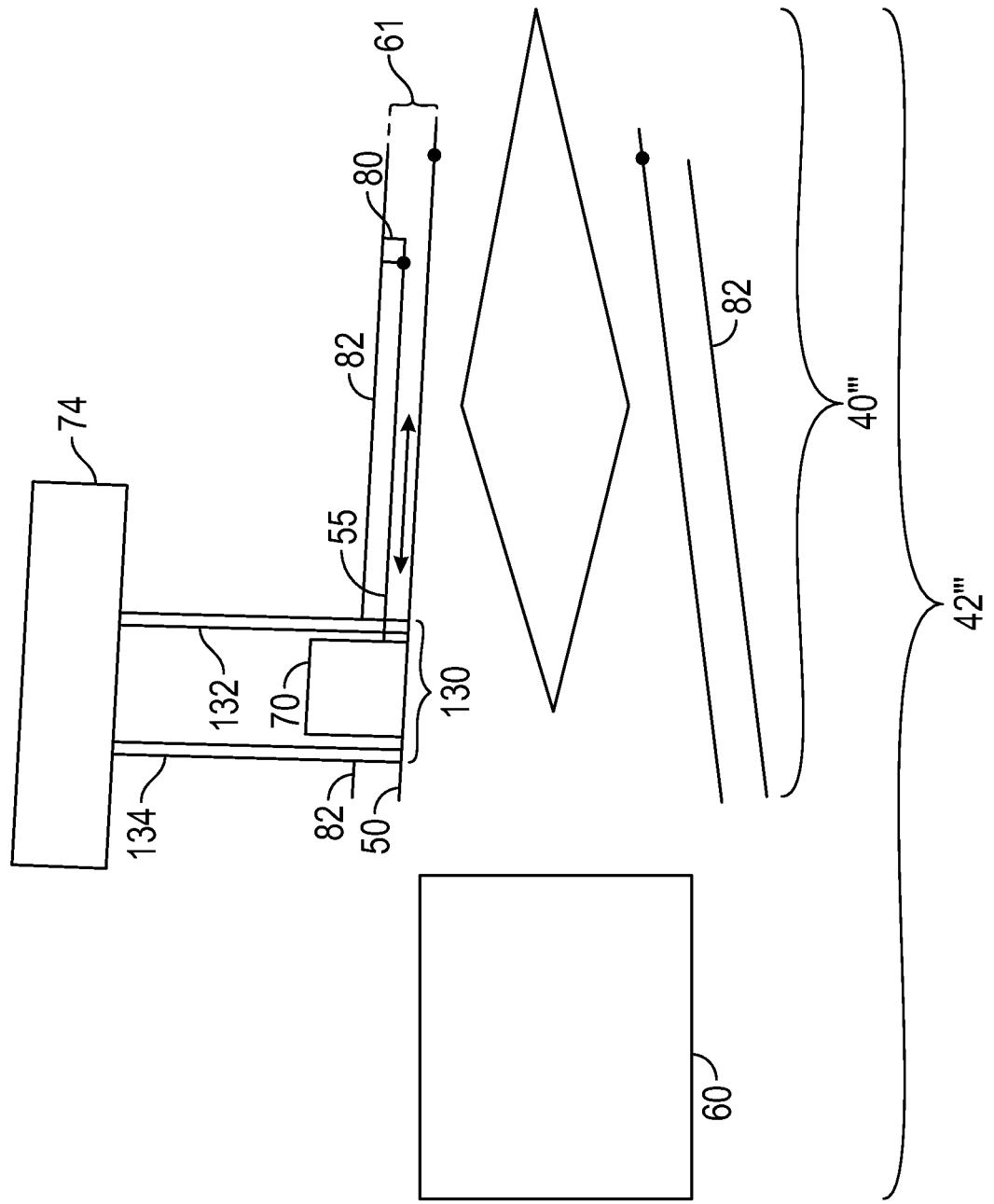
FIG. 7 is a schematic cross-sectional view illustrating another alternate non-limiting embodiment of a nozzle assembly and a propulsion system made in accordance with the teachings disclosed herein.

It should be further understood that, for simplification and ease of illustration, FIG. 5 has illustrated a direct coupling between linkage 104 and actuator 102. In an actual application, there would likely be a joint coupled to linkage 104 and an additional linkage coupled to the joint. In such an application, it would be the additional linkage that would be coupled to actuator 102 rather than linkage 104.

As illustrated in FIG. 5, a portion of linkage 104 extends through gap 114. Gap 114 is dimensioned to be large enough to accommodate the presence and movement of linkage 104, but smaller than the smallest dimension of actuator 102 (in the present case, smaller than width W of actuator 102). Accordingly, actuator 102 does not fit in gap 114 and therefore could not be mounted between cowl 110 and nozzle body 112. Rather, gap 114 is just large enough to accommodate linkage 104. By shrinking the size of gap 114 to be just large enough to accommodate linkage 104, the entire nozzle assembly associated with cowl 110 and nozzle body 112 can be given a smaller radial periphery than would be possible if gap 114 were dimensioned to be large enough to accommodate actuator 102.

Alternatively, the pathway for the jet, such as pathway 53, could be given a larger periphery than would be possible if gap 114 dimensioned to be large enough to accommodate actuator 102. Additionally, the entire nozzle assembly can be given a smaller radial periphery and the pathway for the jet can be give a larger radial periphery when gap 114 is reduced to be just large enough to permit linkage 104 to pass through.

With continuing reference to FIGS. 1-5, FIG. 6 is a block diagram illustrating a non-limiting embodiment of a method 120 for assembling a propulsion system for an aircraft. Method 120 may be used to assemble propulsion systems 42, 42', and 42", discussed above. In addition, method 120 may be used to assemble any other propulsion system made in accordance with the teachings disclosed herein.

At step 122, an engine and an exhaust nozzle assembly are obtained. The engine is configured to produce a jet. In some embodiments, the engine may comprise a gas turbine engine. The exhaust nozzle assembly includes a nozzle body that is configured to receive the jet. The exhaust nozzle assembly further includes an outer cover that at least partially covers the nozzle body. The exhaust nozzle assembly further includes a movable component that is configured to move between a first position and a second position with respect to the nozzle body when a force is applied to the movable component. The movable component is disposed and configured to have an effect on either the jet or on an exhaust plume produced by the propulsion system, or both, when the movable component moves between the first position and the second position. The nozzle assembly further includes a linkage that is coupled to the movable component and that is adapted for coupling to an actuator. The actuator is configured to generate the force. The linkage is configured to transmit the force to the moveable component when the linkage is coupled with the actuator and when the actuator is actuated.

At step 124, the nozzle body of the nozzle body assembly is fluidly coupled to the engine. Methods and mechanisms for effecting a fluid coupling of a nozzle body to the downstream end of an engine are well known in the art and, for the sake of brevity, will not be described here.

Regarding the nozzle assembly, a gap is defined by the space between an inner surface of the outer cover and an outer surface of the nozzle body. In some embodiments, a cross-sectional dimension of the linkage may be smaller than a smallest dimension of the actuator. Further, in some embodiments, a dimension of the gap may be smaller than the smallest dimension of the actuator and greater than the cross-sectional dimension of the linkage. This permits the linkage to be at least partially disposed within the gap while precluding the mounting of the actuator within the gap. The exhaust nozzle assembly is free of the actuator.

With continuing reference to FIGS. 1-6, FIG. 7 illustrates a nozzle assembly 40''' and a propulsion system 42''' which are further alternate embodiments of nozzle assembly 40 and propulsion system 42, respectively. In nozzle assembly 40''' and propulsion system 42''', linkage 55 is again coupled with translating hinge 80 and is configured to control the deployment of a thrust reverser door 82. In this respect, nozzle assembly 40''' and propulsion system 42''' are similar to nozzle assembly 40" and propulsion system 42", respectively. The difference between the two propulsion systems and between the two nozzle assemblies is that with nozzle assembly 40''' and propulsion system 42''', actuator 70 was spaced apart from nozzle assembly 40'''. In the embodiment illustrated in FIG. 7, however, actuator 70 is mounted directly to nozzle body 50. Specifically, actuator 70 is mounted proximate a mounting location 130 on nozzle body 50. Mounting location 130 is the location where a mounting structure 132 attaches nozzle assembly 40''' to aircraft component 74. Mounting structure 132 may comprise any suitable load bearing structure effective for mounting a propulsion system to an aircraft component such as a fuselage or a wing or other load bearing structure.

Surrounding mounting structure 132 and actuator 70 is a fairing 134. Fairing 134 is configured to provide an aerodynamic enclosure around mounting structure 132 and actuator 70 to reduce drag while aircraft 20 is in flight. This mounting arrangement permits the actuator 70 to be mounted closer to the movable component as compared with the earlier described embodiments discussed above while still permitting the cowl to be placed as close to nozzle body 50 as permitted by linkage 55, thereby reducing the overall circumferential periphery of nozzle assembly 40'''.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An exhaust nozzle assembly for use with a propulsion system for an aircraft, the propulsion system including an engine configured to produce a jet, the exhaust nozzle assembly comprising:
   a nozzle body configured to be fluidly coupled with the engine and to receive the jet;
   an outer cover at least partially covering the nozzle body;
   a movable component configured to move between a first position and a second position when a force is applied to the movable component, the movable component disposed and configured to have an effect on one of the jet and an exhaust plume produced by the propulsion system when the movable component moves between the first position and the second position; and
   a linkage coupled to the movable component and adapted for coupling to an actuator configured to generate the force, the linkage transmitting the force to the moveable component when the linkage is coupled with the actuator and when the actuator is actuated,
   wherein a gap exists between an inner surface of the outer cover and an outer surface of the nozzle body,
   wherein the linkage is partially disposed within the gap,
   wherein the actuator is disposed proximate an upstream end of the exhaust nozzle assembly, and
   wherein a cross-sectional dimension of the linkage is smaller than a smallest dimension of the actuator, and wherein a dimension of the gap downstream of the actuator is smaller than the smallest dimension of the actuator and greater than the cross-sectional dimension of the linkage.

2. The nozzle assembly of claim 1, wherein the actuator is disposed on the upstream end of the exhaust nozzle.

3. The exhaust nozzle assembly of claim 1, wherein the movable component comprises a thrust reverser.

4. The exhaust nozzle assembly of claim 1, wherein the moveable component comprises a variable A8.

5. The exhaust nozzle assembly of claim 1, wherein the moveable component comprises a variable A9.

6. A propulsion system for an aircraft, the propulsion system comprising:
   an engine configured to produce a jet; and
   an exhaust nozzle assembly disposed downstream of the engine, the exhaust nozzle assembly including:
      a nozzle body fluidly coupled with the engine and configured to receive the jet;
      an outer cover at least partially covering the nozzle body;
      a movable component configured to move between a first position and a second position when a force is applied to the movable component, the movable component disposed and configured to have an effect on one of the jet and an exhaust plume produced by the propulsion system when the movable component moves between the first position and the second position; and
   a linkage coupled to the movable component and adapted for coupling to an actuator, the actuator configured to generate the force, the linkage transmitting the force to the moveable component when the linkage is coupled with the actuator and when the actuator is actuated,
   wherein a gap exists between an inner surface of the outer cover and an outer surface of the nozzle body,
   wherein the linkage is partially disposed within the gap,
   wherein the actuator is disposed proximate an upstream end of the exhaust nozzle assembly, and
   wherein a cross-sectional dimension of the linkage is smaller than a smallest dimension of the actuator, and wherein a dimension of the gap downstream of the actuator is smaller than the smallest dimension of the actuator and greater than the cross-sectional dimension of the linkage.

7. The nozzle assembly of claim 6, wherein the actuator is disposed on the upstream end of the exhaust nozzle.

8. The propulsion system for an aircraft of claim 6, wherein the movable component comprises a thrust reverser.

9. The propulsion system for an aircraft of claim 6, wherein the moveable component comprises a variable A8.

10. The propulsion system for an aircraft of claim 6, wherein the moveable component comprises a variable A9.

11. An aircraft comprising:
    a fuselage;
    a wing coupled with the fuselage;
    an actuator; and
    a propulsion system mounted to one of the fuselage and the wing, the propulsion system including:
       an engine configured to produce a jet, and
       an exhaust nozzle assembly disposed downstream of the engine, the exhaust nozzle assembly including:
          a nozzle body fluidly coupled with the engine and configured to receive the jet,
          an outer cover at least partially covering the nozzle body,
          a movable component configured to move between a first position and a second position when a force is applied to the movable component, the movable component disposed and configured to have an effect on one of the jet and an exhaust plume produced by the propulsion system when the movable component moves between the first position and the second position, and a linkage coupled to the movable component and further coupled to the actuator, the actuator configured to generate the force, the linkage transmitting the force to the moveable component when the actuator is actuated, wherein a gap exists between an inner surface of the outer cover and an outer surface of the nozzle body, wherein the linkage is partially disposed within the gap, wherein the actuator is disposed proximate an upstream end of the exhaust nozzle assembly, and wherein a cross-sectional dimension of the linkage is smaller than a smallest dimension of the actuator, and wherein a dimension of the gap downstream of the actuator is smaller than the smallest dimension of the actuator and greater than the cross-sectional dimension of the linkage.

12. The aircraft of claim 11, wherein the actuator is disposed on the upstream end of the exhaust nozzle.

13. The aircraft of claim 11, further comprising a pylon coupling the propulsion system to the wing.

14. The aircraft of claim 13, wherein the actuator is enclosed with an outer fairing of the pylon.

15. The aircraft of claim 11, wherein the movable component comprises a thrust reverser.

16. The aircraft of claim 11, wherein the movable component comprises a variable A8.

17. The aircraft of claim 11, wherein the moveable component comprises a variable A9.

\* \* \* \* \*